(12) United States Patent
Ishikawa et al.

(10) Patent No.: US 10,328,394 B2
(45) Date of Patent: Jun. 25, 2019

(54) MEMBRANE CARTRIDGE AND MEMBRANE-CARTRIDGE PRODUCTION METHOD

(71) Applicant: KUBOTA CORPORATION, Osaka-shi, Osaka (JP)

(72) Inventors: Kimihiro Ishikawa, Amagasaki (JP); Motofumi Tajima, Amagasaki (JP); Makoto Takahashi, Amagasaki (JP); Kenichi Ohnishi, Amagasaki (JP); Yasunobu Okajima, Amagasaki (JP)

(73) Assignee: Kubota Corporation, Osaka (JP)

( * ) Notice: Subject to any disclaimer, the term of this patent is extended or adjusted under 35 U.S.C. 154(b) by 907 days.

(21) Appl. No.: 14/866,577

(22) Filed: Sep. 25, 2015

(65) Prior Publication Data
US 2016/0016123 A1    Jan. 21, 2016

Related U.S. Application Data

(63) Continuation of application No. PCT/JP2014/058790, filed on Mar. 27, 2014.

(30) Foreign Application Priority Data

Mar. 27, 2013   (JP) ................................ 2013-066087

(51) Int. Cl.
  *C02F 3/12*   (2006.01)
  *B01D 63/08*  (2006.01)
  (Continued)

(52) U.S. Cl.
  CPC ........... *B01D 69/06* (2013.01); *B01D 63/081* (2013.01); *B01D 63/082* (2013.01);
  (Continued)

(58) Field of Classification Search
  CPC ............ B01D 2323/42; B01D 2315/06; B01D 2313/04; C02F 3/1273; Y02W 10/15
  (Continued)

(56) References Cited

U.S. PATENT DOCUMENTS 5,651,888 A * 7/1997 Shimizu ................ B01D 29/111
                                                  210/321.64
2005/0126966 A1   6/2005 Tanida et al.
(Continued)

FOREIGN PATENT DOCUMENTS

CN        1895755      1/2007
CN      101878063     11/2010
(Continued)

OTHER PUBLICATIONS

Search Report dated May 13, 2014 from International Application No. PCT/JP2014/058790.

*Primary Examiner* — Vishal V Vasisth
(74) *Attorney, Agent, or Firm* — Beyer Law Group LLP

(57) ABSTRACT

A low-cost membrane cartridge and a low-cost method for producing a membrane cartridge, in which fatigue durability can be increased with a simple structure, are provided by focusing on a bonding position of the filtration membrane onto the filtration plate. The membrane cartridge includes a filtration membrane disposed on both faces of a filtration plate made of a thermoplastic resin, such that a joining portion provided at the periphery of the filtration membrane is joined to the filtration plate. At least an inner edge portion of the joining portion has a downward inclination with respect to the surface of the filtration plate inside of the inner edge portion at an angle in a range of 10 to 45 degrees toward an outer peripheral edge of the filtration membrane. The joining portion is pressed and welded using a heating plate or an ultrasonic horn having such an inclined surface.

9 Claims, 6 Drawing Sheets

(51) Int. Cl.
     *B01D 65/00*     (2006.01)
     *B01D 69/06*     (2006.01)
     *B01D 61/18*     (2006.01)

(52) U.S. Cl.
     CPC .......... *B01D 65/003* (2013.01); *C02F 3/1273* (2013.01); *B01D 61/18* (2013.01); *B01D 2313/04* (2013.01); *B01D 2315/06* (2013.01); *B01D 2323/42* (2013.01); *Y02W 10/15* (2015.05)

(58) Field of Classification Search
     USPC .................. 210/483, 321.6; 156/60, 73.1
     See application file for complete search history.

(56) References Cited

U.S. PATENT DOCUMENTS

| | | |
|---|---|---|
| 2008/0251440 A1 | 10/2008 | Saito et al. |
| 2010/0300955 A1 | 12/2010 | Uejima et al. |
| 2011/0005994 A1 | 1/2011 | Masutani et al. |
| 2012/0145278 A1 | 6/2012 | Rosch et al. |

FOREIGN PATENT DOCUMENTS

| | | |
|---|---|---|
| CN | 101980764 | 2/2011 |
| JP | 05-168868 | 7/1993 |
| JP | 06-218240 | 8/1994 |
| JP | 2001-120958 | 5/2001 |
| JP | 2006-231139 | 9/2006 |

\* cited by examiner

MEMBRANE CARTRIDGE AND MEMBRANE-CARTRIDGE PRODUCTION METHOD

CLAIM OF PRIORITY

This application is a Continuation of International Patent Application No. PCT/JP2014/058790, filed on Mar. 27, 2014, which claims priority to Japanese Patent Application No. 2013-066087, filed on Mar. 27, 2013, each of which is hereby incorporated by reference.

BACKGROUND OF THE INVENTION

1. Field of the Invention

The present invention relates to a membrane cartridge and a method for producing a membrane cartridge.

2. Description of the Related Art

An immersion-type membrane separation device is suitably used as a solid-liquid separation device in a facility for water treatment such as wastewater purification treatment. The immersion-type membrane separation device contains a plurality of flat-plate membrane cartridges each of which includes a filtration plate made of a resin and a filtration membrane provided on both sides of the filtration plate and joined thereto at a periphery thereof.

Japanese Patent Publication No. H06-218240 discloses a method for producing a membrane module aiming at preventing bonding unevenness of a filtration membrane to a filtration plate, improving bonding efficiency, and thereby securing the airtightness of the membrane module, by covering a surface of an organic material membrane support body with an organic filtration membrane, and thermally bonding the periphery of the organic filtration membrane to the membrane supporting body by local heating.

Japanese Patent Publication No. 2001-120958 proposes an immersion-type membrane cartridge production method in order to provide a producing method for an immersion-type membrane cartridge having an improved durability against aeration.

The production method of the immersion-type membrane cartridge includes forming on a filtration plate made of a resin double-lined sealing portions and a band-like auxiliary portion which protrude from a surface of the filtration plate and are integrally formed along the periphery of the filtration plate to make a perimeter, wherein an inside sealing portion has a profile lower than that of an outside sealing portion, and the outside sealing portion and the auxiliary portion have the same height. The method further includes disposing a filtration membrane over the surface of the filtration plate so as to cover both of the sealing portions and the auxiliary portion, pressing an up-down horn onto the sealing portions and the auxiliary portion over the filtration membrane, and emitting ultrasonic waves so as to weld the filtration membrane at the sealing portions and the auxiliary portion, thereby forming a liner water stopping portion at the sealing portions so as to maintain the filtration membrane in a tension state, while forming an auxiliary welding portion at the auxiliary portion.

Japanese Patent Publication No. 2006-231139 discloses a membrane cartridge including a support body of a non-woven fabric made of plastic fiber and a microporous filtration membrane bonded onto a smooth surface in a periphery of a filtration plate made of a thermoplastic resin, intending to obtain a membrane cartridge capable of replacing the filtration membrane by reusing the thermoplastic filtration plate when the membrane has broken or deteriorated.

In all of the membrane cartridges disclosed in Japanese Patent Publication Nos. H06-218240, 2001-120958, and 2006-231139, the bonding surface of the filtration membrane onto the filtration plate is a plane parallel to the surface of the filtration plate.

It is generally recognized that, in a plate-like membrane cartridge, a filtration membrane is clinging to a filtration plate by a suction pressure or a natural water head pressure during a filtration operation, is trembling in a slightly bulged state during a relaxation in which only air diffusion is performed without filtration operation, and is kept in a bulged state during a clearing operation under a reversed pressure in which a chemical solution or clear water is injected from the secondary side of the filtration membrane.

In actuality however, the suction pressure during the filtration operation is rather small and in a range of 10 kPa, and the membrane cartridge vibrates vigorously due to an upward flow accompanying the air diffusion from below. Accordingly, the filtration membrane may not perfectly follow the vibration of the filtration plate, but is repeatedly separating from and coming into contact with the filtration plate.

When the filtration membrane repeatedly bulges from and clings to the filtration plate, a joining portion of the filtration membrane to the filtration plate may be fatigued, problematically causing a membrane rapture or membrane detachment.

Accordingly, in order to avoid such a membrane rapture or membrane detachment due to fatigue, Japanese Patent Publication No. 2001-120958 described above discloses a filtration plate structure in which the double-lined sealing portions and the band-like auxiliary portion are formed integrally on the filtration plate along the periphery thereof so as to protrude from the surface of the filtration plate to make the perimeter thereof, where the inside sealing portion has the profile lower than that of the outside sealing portion.

However, a bonding process of a filtration membrane onto a filtration plate having such a complicated shape increases various costs for producing, leaving room for further improvements to increase durability against vibration while reducing the costs.

BRIEF DESCRIPTION OF THE INVENTION

In view of the foregoing, an object of the present invention is to provide a low-cost membrane cartridge and a low-cost method for producing a membrane cartridge in which fatigue durability can be increased with a simple structure, by focusing on a bonding position of the filtration membrane onto the filtration plate.

In order to achieve the above-mentioned object, a first characteristic construction of a membrane cartridge in accordance with one embodiment of the present invention is that the membrane cartridge has a filtration plate made of a thermoplastic resin and a filtration membrane disposed on a surface of the filtration plate, where a joining portion of the filtration membrane provided at a periphery thereof is joined to the filtration plate, and that at least an inner edge portion of the joining portion has a downward inclination with respect to the surface of the filtration plate inside of the inner edge portion toward an outer peripheral edge of the filtration membrane.

In accordance with the construction above, by forming at least the inner edge portion of the joining portion to have the downward inclination with respect to the surface of the filtration plate inside of the inner edge portion toward the outer peripheral edge of the filtration membrane, the same bulging state of the filtration membrane has a smaller bulging angle with respect to the inclined inner edge portion, compared with an inner edge portion parallel to or flush with the surface of the filtration plate inside thereof, thereby reducing a bending stress affecting the joining portion of the filtration membrane so as to increase a fatigue durability thereof.

A second characteristic construction of the membrane cartridge in accordance with one embodiment of the present invention is, in addition to the first characteristic construction described above, that the downward inclination is equal to or greater than 10 degrees and equal to or smaller than 50 degrees.

By forming the downward inclination equal to or greater than 10 degrees and equal to or smaller than 50 degrees, bending of the filtration membrane at the joining portion can be effectively suppressed.

A third characteristic construction of the membrane cartridge in accordance with one embodiment of the present invention is, in addition to the first characteristic construction described above, that the downward inclination is equal to or greater than 15 degrees and equal to or smaller than 35 degrees.

By forming the downward inclination equal to or greater than 15 degrees and equal to or smaller than 35 degrees, bending of the filtration membrane at the joining portion can be further effectively suppressed.

A first characteristic construction of a method for producing a membrane cartridge in accordance with one embodiment of the present invention is that the method produces the membrane cartridge having a filtration plate made of a thermoplastic resin and a filtration membrane disposed on a surface of the filtration plate, where a joining portion of the filtration membrane provided at a periphery thereof is joined to the filtration plate, and that the filtration membrane is joined by pressing a pressing tool onto the filtration plate with the periphery of the filtration membrane sandwiched therebetween, the pressing tool having such a slope that at least an inner edge portion of the joining portion is provided with a downward inclination with respect to the surface of the filtration plate inside of the inner edge portion toward an outer peripheral edge of the filtration membrane.

For example, a heating plate, an ultrasonic hone, or the like can be used as the pressing tool, and when the periphery of the filtration membrane is joined to the partially softened or melted filtration plate by an operation of the slope formed on the pressing tool, the downward inclination with respect to the surface of the filtration plate inside of the inner edge portion toward the outer peripheral edge of the filtration membrane is formed in the inner edge portion of the joining portion.

A second characteristic construction of the method of producing the membrane cartridge in accordance with one embodiment of the present invention is, in addition to the first characteristic construction described above, that the surface of the filtration plate corresponding to the joining portion is not downwardly inclined before the joining process is performed.

Since the surface of the filtration plate corresponding to the joining portion does not have the downward inclination before the joining process and then is formed into a downward inclination by the joining process, even if the joining conditions fluctuate, for example, the temperature applied to the filtration plate from the heating plate, ultrasonic hone, or the like might vary, an amount of thermal deformation varies over a width of the joining portion in order to form such a downward inclination through the joining process, an area realizing a sufficient bonding strength between the filtration plate and the filtration membrane can be secured within the width of the joining portion.

For example, when a flat surface of the filtration plate before the joining is formed into a downward inclination after the joining, the maximum quantity of heat is applied to the outer edge of the width of the joining portion and the minimum quantity of heat is applied to the inner edge thereof, and thus it is more likely that the sufficient bonding strength is realized in a certain area therebetween.

A third characteristic construction of the method for producing the membrane cartridge in accordance with one embodiment of the present invention is, in addition to the first or second characteristic construction described above, that the slope of the pressing tool is set such that the downward inclination is equal to or greater than 10 degrees and equal to or smaller than 50 degrees.

A fourth characteristic construction of the method for producing the membrane cartridge in accordance with one embodiment of the present invention is, in addition to the first or second characteristic construction described above, that the slope of the pressing tool is set such that the downward inclination is equal to or greater than 15 degrees and equal to or smaller than 35 degrees.

As described above, in accordance with the present invention, it became possible to provide a low-cost membrane cartridge and a low-cost method for producing a membrane cartridge in which a fatigue durability can be increased using a simple structure by focusing on a bonding position of the filtration membrane onto the filtration plate.

DETAILED DESCRIPTION OF EMBODIMENTS OF THE INVENTION

Hereinafter, embodiments of the membrane cartridge and the method for producing the membrane cartridge in accordance with the present invention are explained.

Figure 1:
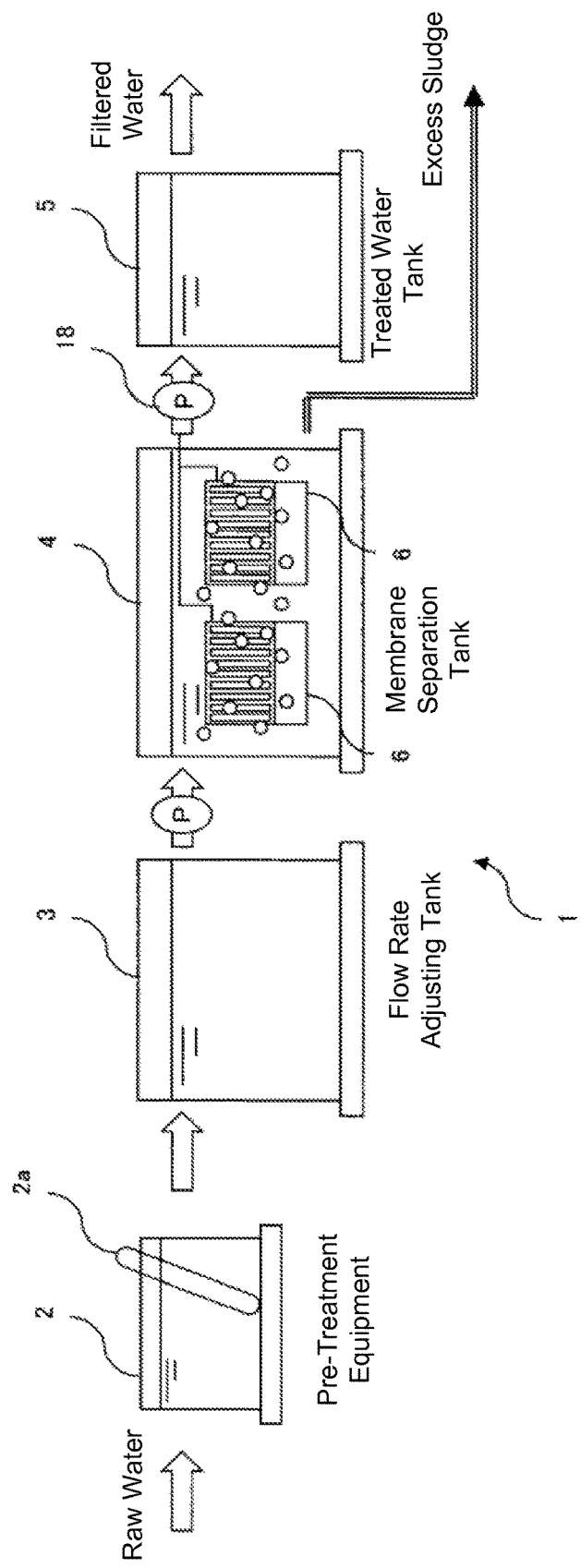
FIG. 1 is a diagram explaining a wastewater treatment device.

As shown in FIG. 1, a wastewater treatment apparatus 1 employing a membrane bioreactor process is provided with a pre-treatment equipment 2, a flow rate adjusting tank 3, a membrane separation tank 4 in which a membrane separation device 6 is immersed, and a treated water tank 5.

The pre-treatment equipment 2 is provided with a bar screen 2a and the like which removes foreign materials and the like mixed in raw water which becomes water to be treated. The flow rate adjusting tank 3 retains the raw water from which foreign materials have been removed by the bar screen 2a and the like. A flow rate adjusting mechanism such as a pump or valve, and the like, is provided such that the raw water is stably supplied to the membrane separation tank 4 from the flow rate adjusting tank 3 at a constant flow rate even if the raw water inflow fluctuates.

In the membrane separation tank 4 which is filled with activated sludge, organic matter contained in the raw water is decomposed by the biological treatment by the activated sludge, and permeated water which has been filtered via the membrane separation device 6 is guided to the treated water tank 5 in which the permeated water is temporarily stored and then discharged. Excess of the activated sludge which has been multiplied in the membrane separation tank 4 is pulled out therefrom so as to maintain a constant concentration of the activated sludge.

Figure 2:
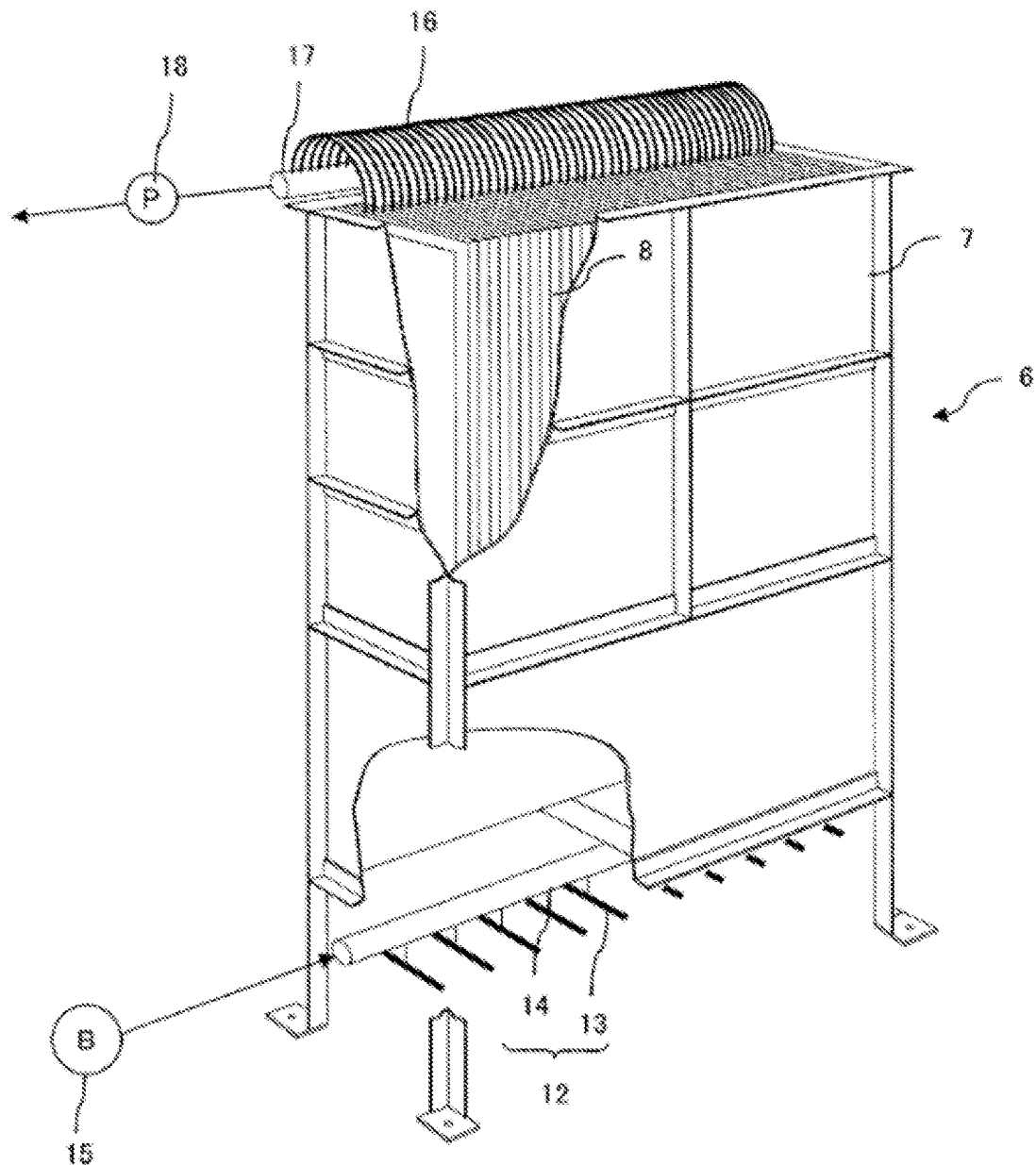
FIG. 2 is a diagram explaining a membrane separation device.

As shown in FIG. 2, the membrane separation device 6 is provided with one hundred (100) plate-shaped membrane cartridges 8 disposed in a membrane case 7 having upper and lower open ends such that the membrane surfaces are arranged in respective longitudinal positions and separated from each other with a fixed distance of about 6 mm to 10 mm (8 mm in this embodiment), and with a diffuser device 12 disposed under the membrane case 7.

The diffuser device 12 is provided with a diffusion pipe 13 having a plurality of diffusion holes, and is connected via a diffusion header 14 coupled to the diffusion pipe 13 to a blower 15 provided outside of the tank.

A pump 18 as a pressure difference generating mechanism external to the tank is connected to the membrane cartridges 8 via a liquid collection pipe 17, whereby the water to be treated in the tank is sucked and filtered through a membrane of the membrane cartridges 8.

Figure 3:
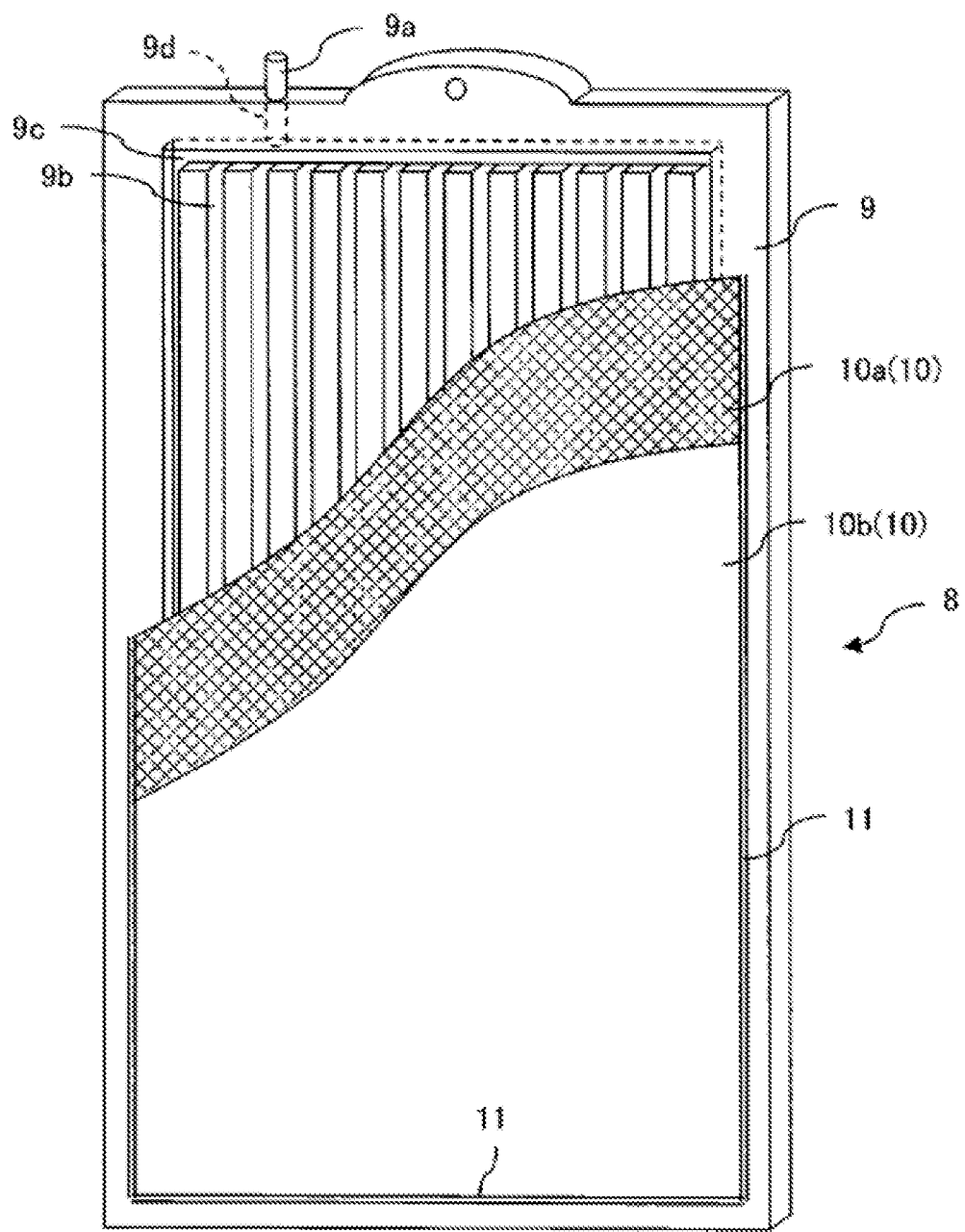
FIG. 3 is a diagram explaining a membrane cartridge.

As shown in FIG. 3, in each of the membrane cartridges 8, a filtration membrane 10 is disposed on both of the front and rear faces of a filtration plate 9 made of a thermoplastic resin such as ABS resin having a height of 1000 mm and a width of 490 mm. A joining portion 11 of the filtration membrane 11 provided at the periphery thereof is bonded to the filtration plate 9 by ultrasonic or thermal welding, or is adhered thereto using an adhesive.

The filtration membrane 10 is an organic filtration membrane including a support body 10a formed of a nonwoven fabric made of PET fiber, for example, and a microporous membrane 10b having an average pore diameter of about 0.2 which is formed by coating and impregnating the support body 10a with a porous resin.

A plurality of grooves 9b having a depth of about 2 mm and a width of about 2 mm are formed on a surface of the filtration plate 9 along a longitudinal direction, and a horizontal groove 9c is formed at an upper end of the grooves 9b so as to communicate with each of the grooves 9b. The front and rear surfaces of the filtration plate 9 have respective horizontal grooves 9c which communicate with each other via a communication hole 9d which in turn communicates with a nozzle 9a formed at an upper edge portion of the filtration plate 9.

As shown in FIG. 2, the nozzle 9a is connected to the liquid collection pipe 17 via a respective tube 16, and the pump 18 is connected to the liquid collection pipe 17, such that the permeated water sucked by the pump 18 is transported to the treated water tank 5.

By operating the diffuser device 12 in the membrane separation device 6 and the pump 18, a filtering operation is performed to obtain the permeated water by passing the water to be treated through the filtration membrane 10.

A relaxation operation in which only the diffuser device 12 is operated while the pump 18 is stopped is performed regularly, or when the suction pressure during the filtering operation becomes high, in order to prevent fouling of the filtration membrane 10 while maintaining characteristics of the activated sludge in the tank.

In addition, a chemical solution cleaning process for cleaning the filtration membrane 10 by injecting a chemical solution into each membrane cartridge 8 via the liquid collection pipe 17 is performed regularly, or when the suction pressure after the relaxation operation becomes high.

The membrane cartridge 8 vibrates vigorously during the filtering operation due to an upward flow accompanying the air diffusion from below, whereby the filtration membrane 10 does not follow the vibration of the filtration plate 9 so as to repeatedly cling to and separate from the filtration plate 9. During the relaxation operation in which the pump 18 is stopped, the filtration membrane 10 of the membrane cartridge 8 widely trembles in such a state that the filtration membrane 10 is slightly bulged from the filtration plate 9 due to the upward flow accompanying the air diffusion from below. During the chemical cleaning, the filtration membrane is maintained in a continuously bulged state. For example, in such a chemical cleaning process, the filtration membrane 10 bulges from the filtration plate at the joining portion with a rising angle about 50 degrees.

The filtration membrane 10 receives a strong stress to the joining portion by changing its position from that clings to the filtration plate 9 to that bulging from the filtration plate 9, and the risk that the filtration membrane raptures or comes off at the joining portion due to fatigue increases when the joining portion is repeatedly subject to such a stress over time.

Figure 4A:
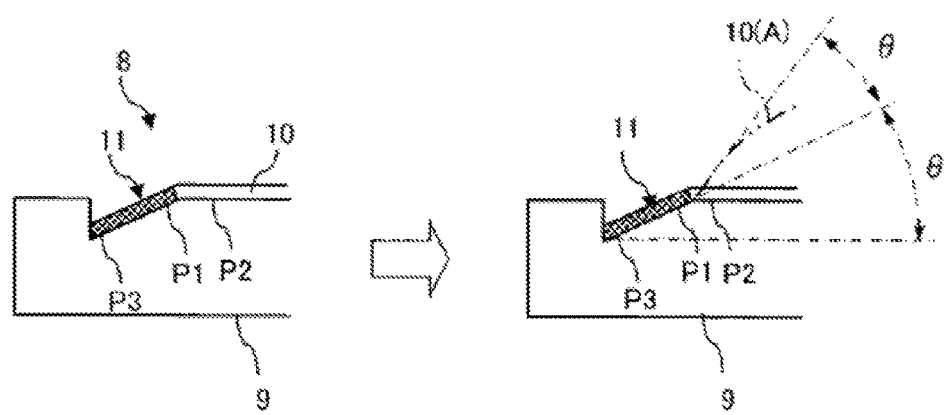
FIG. 4A is a diagram showing a cross-sectional view of a main portion of the membrane cartridge in accordance with the present invention.

Accordingly, as shown in the left diagram in FIG. 4A, the membrane cartridge 8 has a filtration plate 9 and a filtration membrane 10 disposed on the surface of the filtration plate 9, and a joining portion 11 of the filtration membrane 10 provided at a periphery thereof is joined to the filtration plate 9 such that at least an inner edge portion P1 of the joining portion 11 has a downward inclination with respect to the surface P2 of the filtration plate 9 inside of the inner edge portion P1 toward an outer peripheral edge P3 of the filtration membrane 10.

As shown in the right diagram in FIG. 4A, by providing at least the inner edge portion P1 within the joining portion 11 with the downward inclination with respect to the filtration plate surface P2 inside of the inner edge portion P1 downwardly inclining toward the outer peripheral edge P3 of the filtration membrane 10, a bulging angle of the filtration membrane 10 with respect to the inner edge portion P1, i.e., a rising angle $\theta$ of the filtration membrane 10(A) indicated by a two-dot chain line with respect to the inner edge portion P1, becomes relatively small, compared with such an angle formed with respect to an inner edge portion parallel to or flush with the filtration plate surface P2 inside thereof, thereby reducing a bending stress affecting the joining portion 11 of the filtration membrane 10. It should be noted that the entire joining portion 11 may be formed into a downward inclination in the width direction with respect to the filtration plate surface P2 toward the outer peripheral edge P3 of the filtration membrane 10.

Figure 4B:
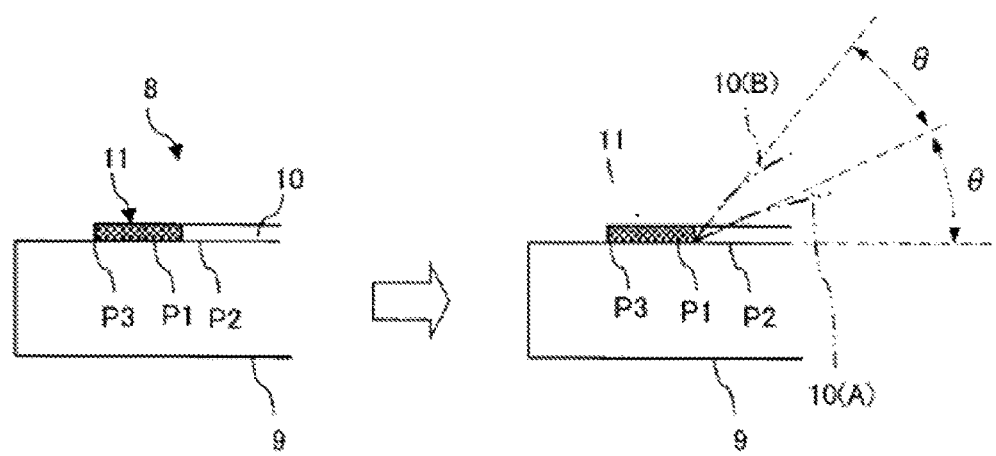
FIG. 4B is a diagram showing a cross-sectional view of a main portion of a conventional membrane cartridge.

The right side diagram in FIG. 4B shows a conventional structure in which the inner edge portion P1 of the joining portion 11 is formed parallel to or flush with the filtration plate surface P2 inside thereof. As shown in the figure, in a case where the filtration membrane 10(B) indicated by a two-dot chain line bulges from the filtration plate surface adjacent to the joining portion 11 at a rising angle 2θ, if the structure shown in FIG. 4A is employed, the bending stress would be reduced to that of the rising angle θ, whereby the fatigue durability can be increased.

It is preferable that the downward inclination is equal to or greater than 10 degrees and equal to or smaller than 50 degrees, and more preferably, the downward inclination is equal to or greater than 15 degrees and equal to or smaller than 35 degrees. By forming the downward inclination equal to or greater than 10 degrees and equal to or smaller than 50 degrees, bending of the filtration membrane 10 at the joining portion 11 can be effectively suppressed, and by forming the downward inclination equal to or greater than 15 degrees and equal to or smaller than 35 degrees, the bending of the filtration membrane 10 at the joining portion 11 can be further effectively suppressed. The width of the downwardly inclined area in the joining portion 11 is preferably in a range between 1 mm and 10 mm.

The filtration membrane 10 may be welded to the filtration plate 9 by pressing a heating plate heated to a predetermined temperature or an ultrasonic horn onto the filtration plate 9 with the periphery of the filtration membrane 10 sandwiched therebetween. In addition to the heating plate and ultrasonic horn, a high-temperature gas such as heating steam can be jetted out from a tip of a heating member. An adhesive may also be used for bonding the filtration membrane 10 to the filtration plate 9.

In the latter case, an inclined portion can be formed in advance in an area of the filtration plate 9 which correspond to the inner edge portion of the joining portion such that the inclined portion is downwardly inclined with respect to the surface of the filtration plate 9 toward the outer edge of the filtration membrane 10.

In the former case, the heating plate, the ultrasonic horn, or the heating member may have such a slope that at least the inner edge portion is provided with the downward inclination with respect to the surface of the filtration plate inside of the inner edge portion toward the outer peripheral edge of the filtration membrane.

Figure 5A:
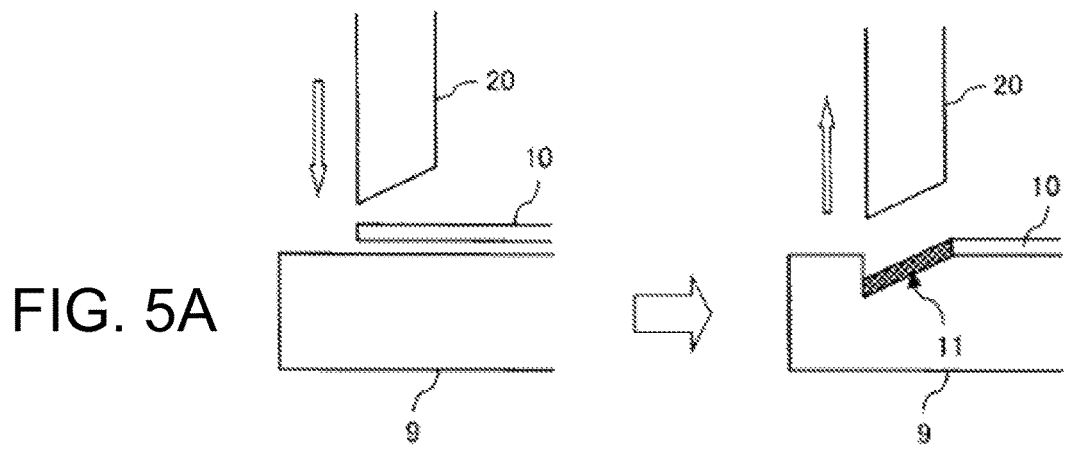
FIG. 5A is a diagram explaining a method for producing a membrane cartridge in accordance with the present invention.

For example, as shown in FIG. 5A, the filtration membrane 10 can be welded to the filtration plate 9 by pressing a heating plate or ultrasonic horn 20 having a sloped tip portion having a predetermined inclination angle onto the surface of the filtration plate 9 from above.

Figure 6A:
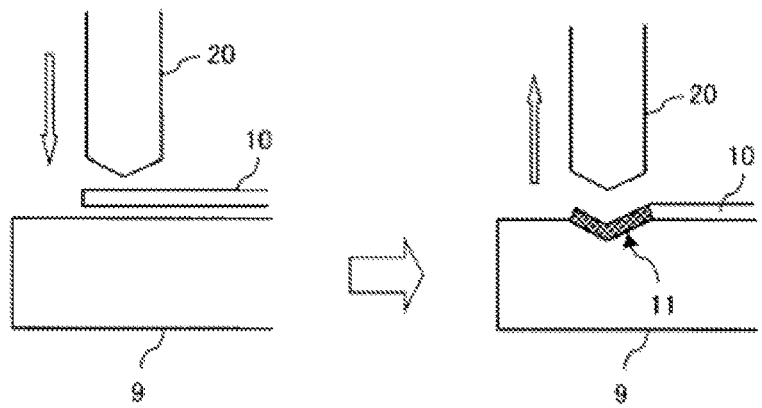
FIGS. 6A through 6C are diagrams explaining the method of producing a membrane cartridge in accordance with other embodiments of the present invention.
Figure 6B:
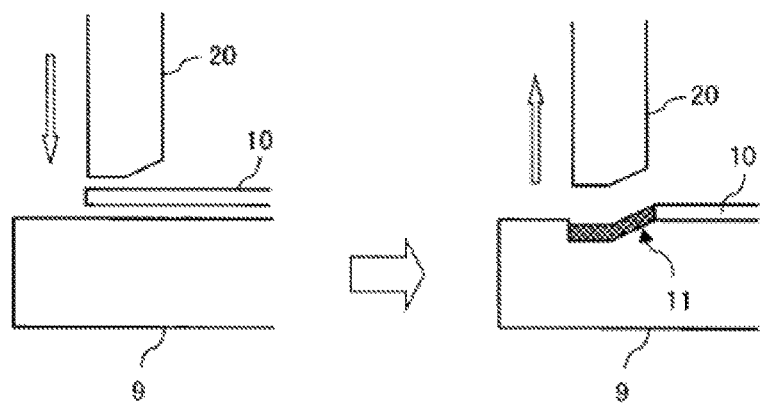
Figure 6C:
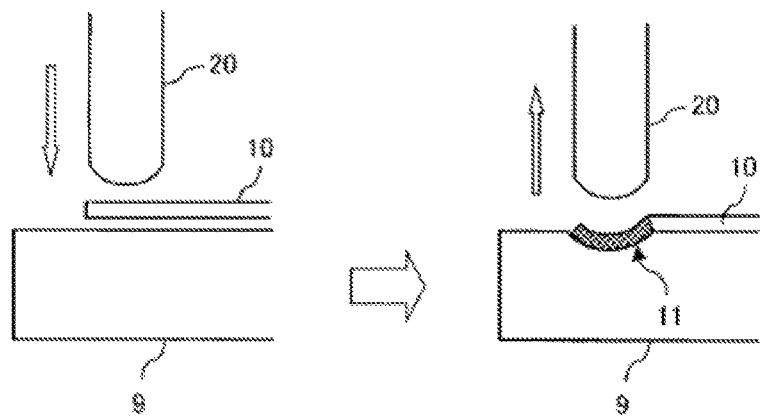

In addition, as shown in FIG. 6A, a heating plate or ultrasonic horn 20 having a tip portion having a V-shaped cross-section with a predetermined inclination angel can be used. As shown in FIG. 6B, a heating plate or ultrasonic horn 20 having a partially sloped tip portion having a slope corresponding to the inner edge portion of the joining portion 11 can also be used such that the remaining portion of the joining portion 11 has a flat surface. As shown in FIG. 6C, a heating plate or ultrasonic horn 20 may have a tip portion having a convex cross-section with an inclination angle within a predetermined range.

FIG. 5A illustrates an example in which a downward inclination inclined with respect to the surface of the filtration plate 9 inside of the inner edge portion of the joining portion 11 toward the outer peripheral edge of the filtration membrane 10 is formed in the inner edge portion by pressing the heating plate or ultrasonic horn 20 onto the filtration plate 9 having a flat surface.

Figure 5B:
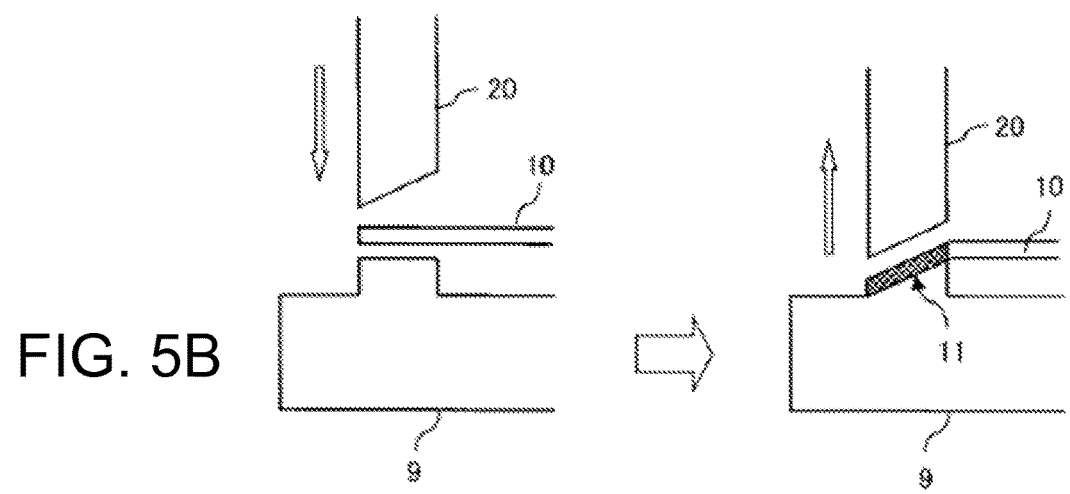
FIGS. 5B and 5C are diagrams explaining the method of producing a membrane cartridge in accordance with other embodiments of the present invention.

FIG. 5B illustrates an example in which a downward inclination inclined with respect to the surface of the filtration plate 9 inside of the inner edge portion of the joining portion 11 toward the outer peripheral edge of the filtration membrane 10 is formed in the inner edge portion by pressing the heating plate or ultrasonic horn 20 onto the filtration plate 9 provided with a protrusion having a flat top surface in an area corresponding to the joining portion 11.

Figure 5C:
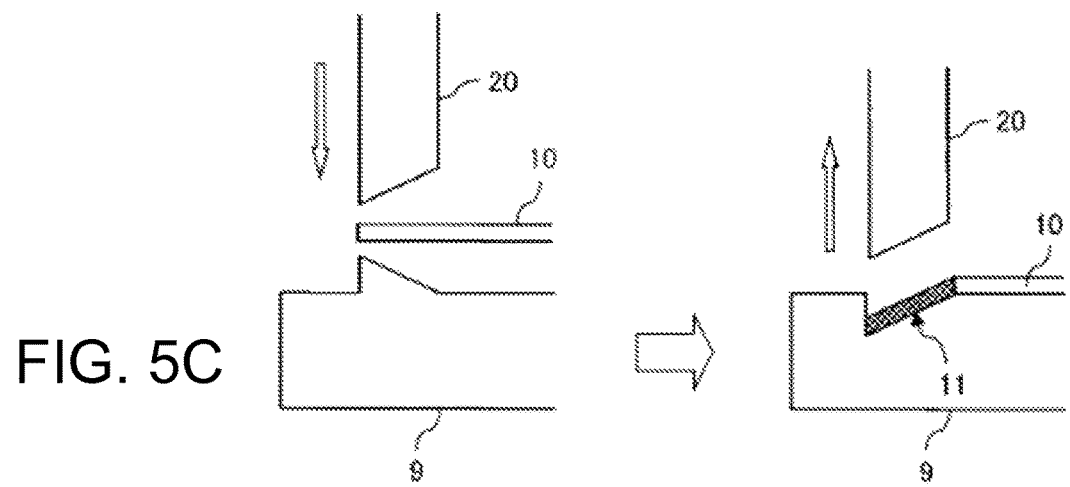

FIG. 5C illustrates an example in which a downward inclination inclined with respect to the surface of the filtration plate 9 inside of the inner edge portion of the joining portion 11 toward the outer peripheral edge of the filtration membrane 10 is formed in the inner edge portion by pressing the heating plate or ultrasonic horn 20 onto the filtration plate 9 provided with a protrusion having an upward inclination toward the outer peripheral edge of the filtration membrane 10 in an area corresponding to the joining portion 11.

It is preferable that the surface of the filtration plate 9 corresponding to the joining portion 11 does not have a downward inclination before the joining process. Since the surface of the filtration plate 9 corresponding to the joining portion 11 does not have a downward inclination before the joining process and then is formed into a downward inclination through the joining process, even if the joining conditions fluctuate, for example, the temperature applied to the filtration plate 9 from the heating plate or ultrasonic horn 20 varies, an amount of thermal deformation or a time period during which the heating plate or ultrasonic horn is in contact with varies over the width of the joining portion in order to form such a downward inclination through the joining process, an area realizing a sufficient bonding strength between the filtration plate 9 and the filtration membrane 10 can be secured within the width of the joining portion.

For example, as shown in FIG. 5A, when a flat surface of the filtration plate 9 before the joining becomes a downward inclination after the joining, the maximum quantity of heat is applied to the outer edge of the joining width and the minimum quantity of heat is applied to the inner edge thereof, and thus it is more likely that the sufficient joining strength is realized in a certain area therebetween.

In addition, when the filtration membrane is joined to the filtration plate using a heating plate or ultrasonic horn, it is preferable that the temperature in the joining portion is equal to or higher than a softening point of the resin constituting the filtration plate and lower than a melting point of the unwoven fabric constituting the filtration membrane, such that the downward slope can be formed in the filtration plate while maintaining the strength of the filtration membrane.

For example, when the filtration plate is made of ABS resin and the nonwoven fabric of the filtration membrane is made of PET resin, the preferable temperature is equal to or greater than 150° C. and equal to or smaller than 250° C., and the output of the heating plate or ultrasonic horn can be adjusted such that the joining portion has the temperature between 150° C. and 250° C.

Each embodiment mentioned above is an example of the present invention, and the present invention is not limited by the description. The material, size, and thickness of the filtration plate and filtration membrane, the shape of the tip of the heating plate or ultrasonic horn, the joining temperature, and the like are not limited to specific examples, but a design of the specific structure of each part can be changed so long as the function and effect of the present invention can be achieved.

What is claimed is:

1. A membrane cartridge comprising:

a filtration plate made of a thermoplastic resin;

a filtration membrane disposed on a surface of the filtration plate; and a joining portion in which a periphery of the filtration membrane is joined to the filtration plate, wherein at least an inner edge portion of the joining portion has a downward inclination with respect to the surface of the filtration plate, the downward inclination inclining from inside of the inner edge portion toward the outer peripheral edge of the filtration membrane, thereby reducing a bending stress to the joining portion.

2. The membrane cartridge of claim 1, wherein the downward inclination is equal to or greater than 10 degrees and equal to or smaller than 50 degrees.

3. The membrane cartridge of claim 1, wherein the downward inclination is equal to or greater than 15 degrees and equal to or smaller than 35 degrees.

4. A method for producing a membrane cartridge comprising a filtration plate made of a thermoplastic resin, a filtration membrane disposed on a surface of the filtration plate, and a joining portion in which a periphery of the filtration membrane is joined to the filtration plate, the method comprising:

joining the filtration membrane by pressing a pressing tool onto the filtration plate with the periphery of the filtration membrane sandwiched therebetween, the pressing tool having such a slope that at least an inner edge portion of the joining portion is provided with a downward inclination inclining with respect to the surface of the filtration plate from inside of the inner edge portion toward the outer peripheral edge of the filtration membrane.

5. The method of claim 4, wherein the surface of the filtration plate corresponding to the joining portion is not downwardly sloped before the joining.

6. The method of claim 4, wherein the slope of the pressing tool is set such that the downward inclination is equal to or greater than 10 degrees and equal to or smaller than 50 degrees.

7. The method of claim 5, wherein the slope of the pressing tool is set such that the downward inclination is equal to or greater than 10 degrees and equal to or smaller than 50 degrees.

8. The method of claim 4, wherein the slope of the pressing tool is set such that the downward inclination is equal to or greater than 15 degrees and equal to or smaller than 35 degrees.

9. The method of claim 5, wherein the slope of the pressing tool is set such that the downward inclination is equal to or greater than 15 degrees and equal to or smaller than 35 degrees.

* * * * *